United States Patent
Hosoda

(10) Patent No.: US 11,163,502 B2
(45) Date of Patent: Nov. 2, 2021

(54) PRINTING APPARATUS, METHOD, AND STORAGE MEDIUM

(71) Applicant: CANON KABUSHIKI KAISHA, Tokyo (JP)

(72) Inventor: Yasuhiro Hosoda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/413,376

(22) Filed: May 15, 2019

(65) Prior Publication Data
US 2019/0361632 A1 Nov. 28, 2019

(30) Foreign Application Priority Data
May 24, 2018 (JP) .............................. JP2018-100073

(51) Int. Cl.
*G06F 3/12* (2006.01)
*G06K 15/00* (2006.01)
*H04N 1/00* (2006.01)

(52) U.S. Cl.
CPC .......... *G06F 3/1204* (2013.01); *G06F 3/1231* (2013.01); *G06F 3/1238* (2013.01); *G06F 3/1288* (2013.01); *G06F 3/1293* (2013.01); *G06K 15/4005* (2013.01); *H04N 1/00408* (2013.01)

(58) Field of Classification Search
CPC .... G06F 3/1204; G06F 3/1293; G06F 3/1288; G06F 3/1231; G06F 3/1238; G06F 21/608; G06K 15/4005; H04N 1/00408
See application file for complete search history.

(56) References Cited

U.S. PATENT DOCUMENTS

| | | | |
|---|---|---|---|
| 2013/0057895 A1* | 3/2013 | Okazawa | G06F 21/44 358/1.14 |
| 2013/0227276 A1* | 8/2013 | Nakajima | H04L 9/3263 713/156 |

FOREIGN PATENT DOCUMENTS

JP 2013-41552 A 2/2013

* cited by examiner

*Primary Examiner* — Neil R McLean
(74) *Attorney, Agent, or Firm* — Canon U.S.A., Inc. I.P. Division

(57) ABSTRACT

A printing apparatus has a function of issuing a notification in a case where an expiration date of a certificate is close and a function of updating the certificate so as to reduce the work a user is required to perform for updating.

13 Claims, 15 Drawing Sheets

FIG.5
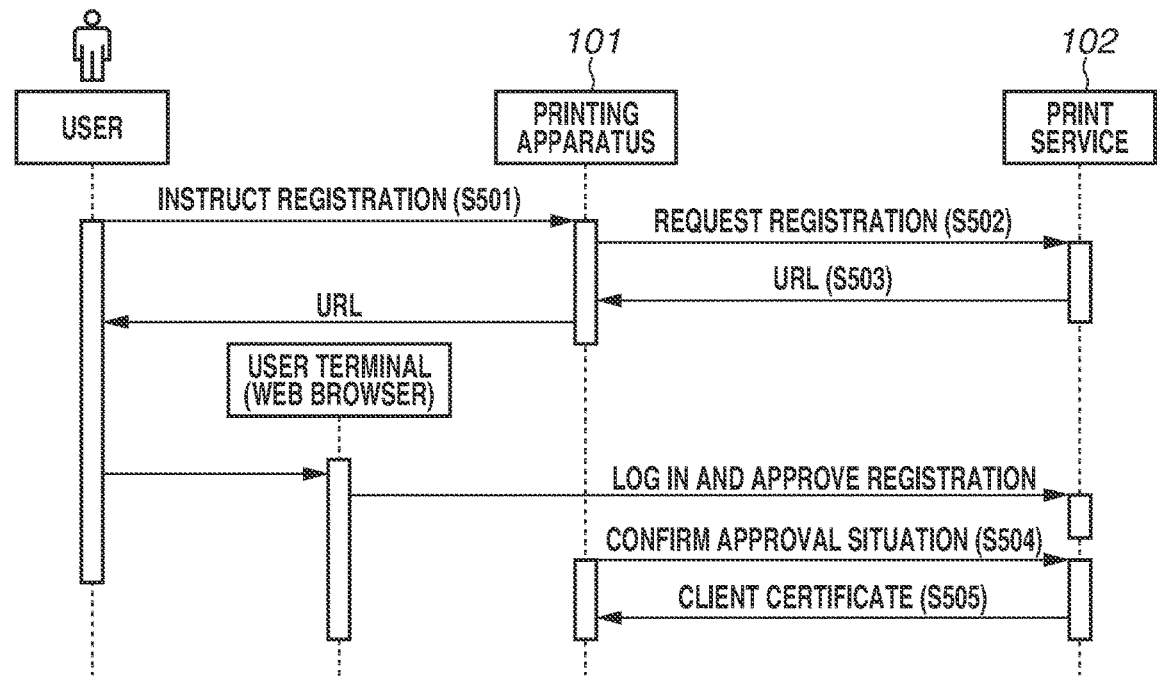
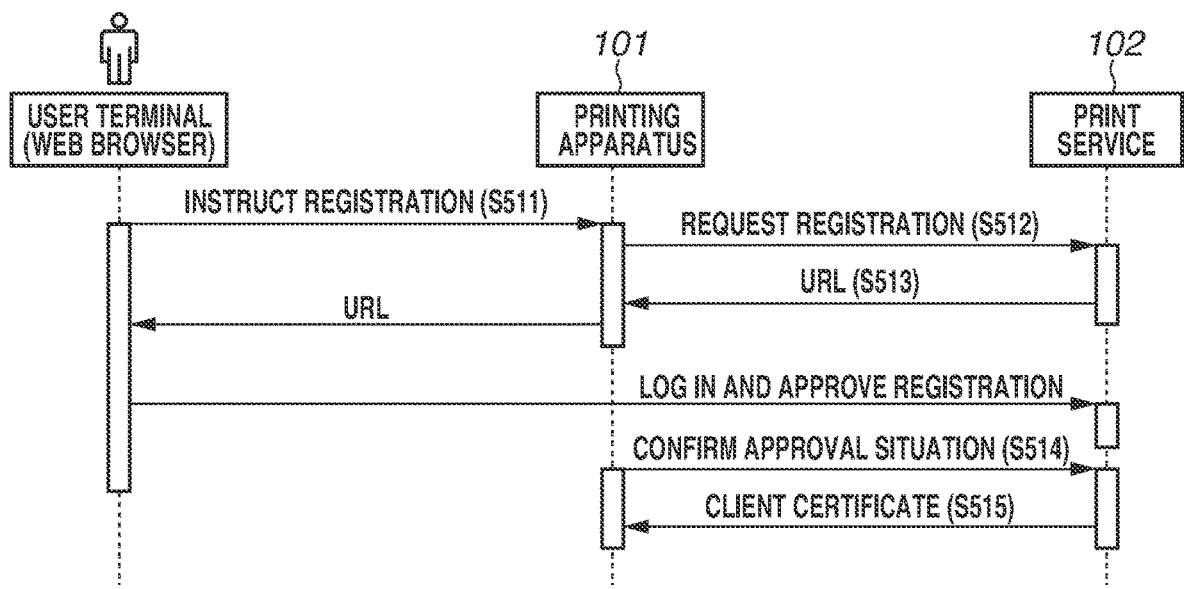

FIG.10

To: printeradmin@conon.jp
From: printer101@conon.jp
Subject: EXPIRATION DATE OF CLOUD PRINTER (PRINTING APPARATUS 101) IS CLOSE.

BODY

THE EXPIRATION DATE OF THE CERTIFICATE OF THE FOLLOWING CLOUD PRINTER IS CLOSE.
IF THE CERTIFICATE EXPIRES, CLOUD PRINT CANNOT BE USED.

1001 — PRINTER NAME: PRINTING APPARATUS 101
SERIAL NUMBER: ABC12345

1002 — EXPIRATION DATE: JANUARY 20, 2020

[UPDATE PROCEDURE]
PLEASE PERFORM UPDATE PROCESSING USING ANY OF THE FOLLOWING METHODS.

1003 — UPDATE METHOD 1
DISPLAY CLOUD PRINT SETTING SCREEN FROM THE LOCAL UI OF THE PRINTING APPARATUS
AND PRESS THE UPDATE BUTTON.

1004 — UPDATE METHOD 2
UPDATE OPERATION CAN BE PERFORMED FROM THE SITE OF THE REMOTE UI OF THE FOLLOWING
PRINTING APPARATUS. ACCESS THE SITE AND PRESS THE UPDATE BUTTON.
http://printer101/cloudprintsetting 1005 — UPDATE METHOD 3
UPDATE OPERATION CAN BE PERFORMED FROM THE SITE OF THE FOLLOWING CLOUD PRINT.
http://cloudprint/printer101

FIG.11
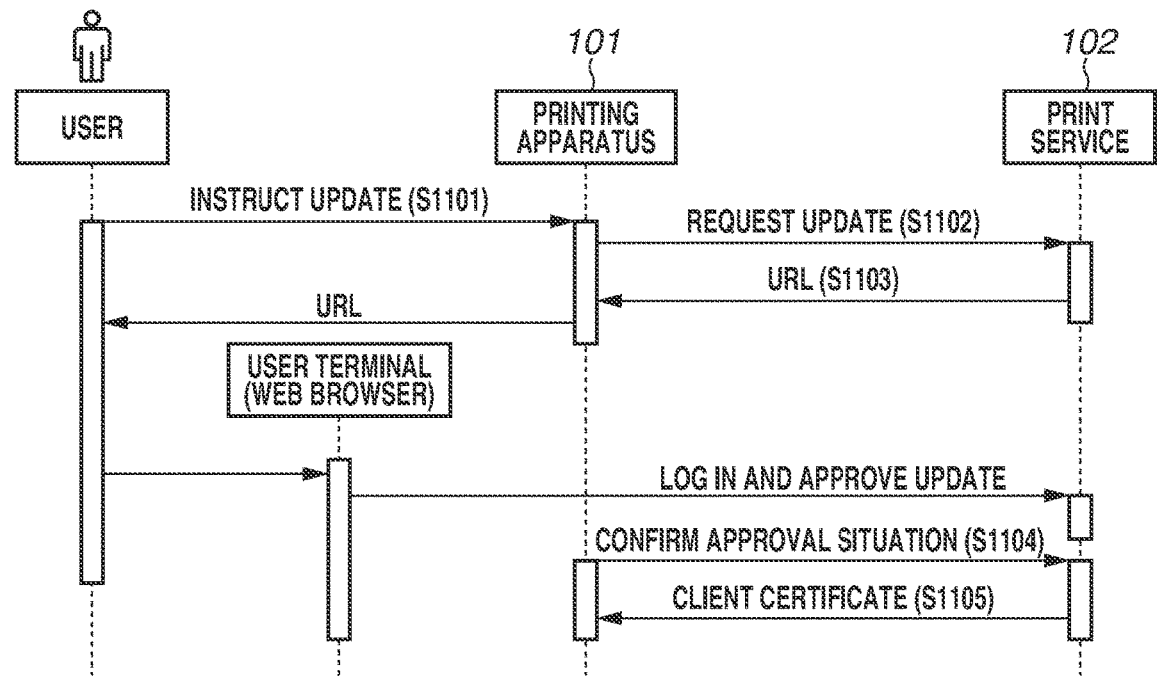
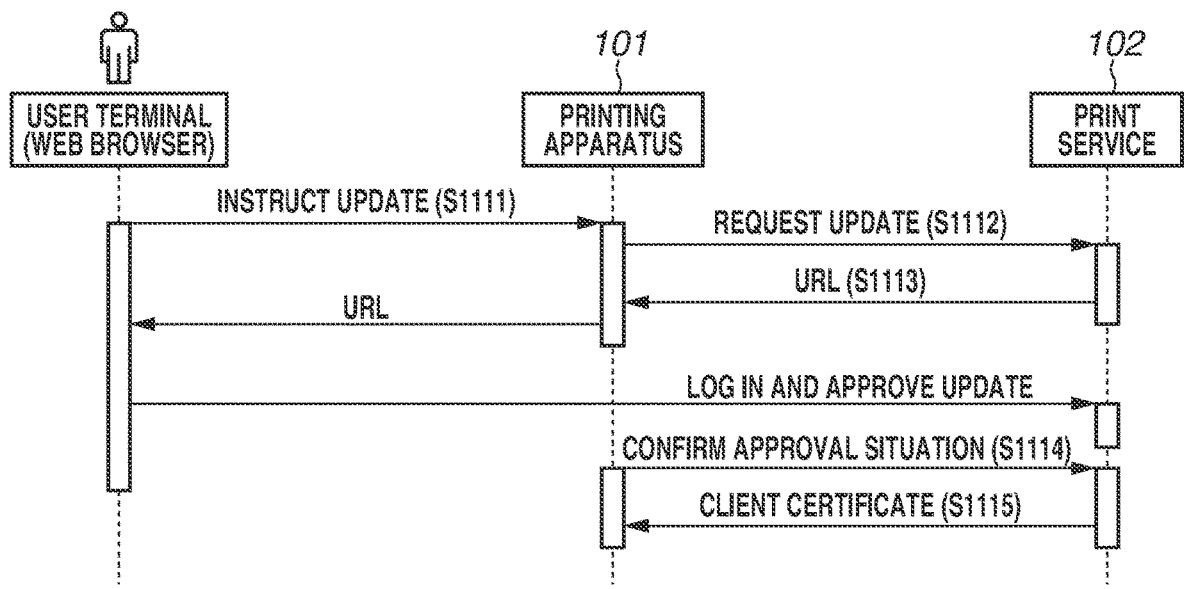

FIG.13
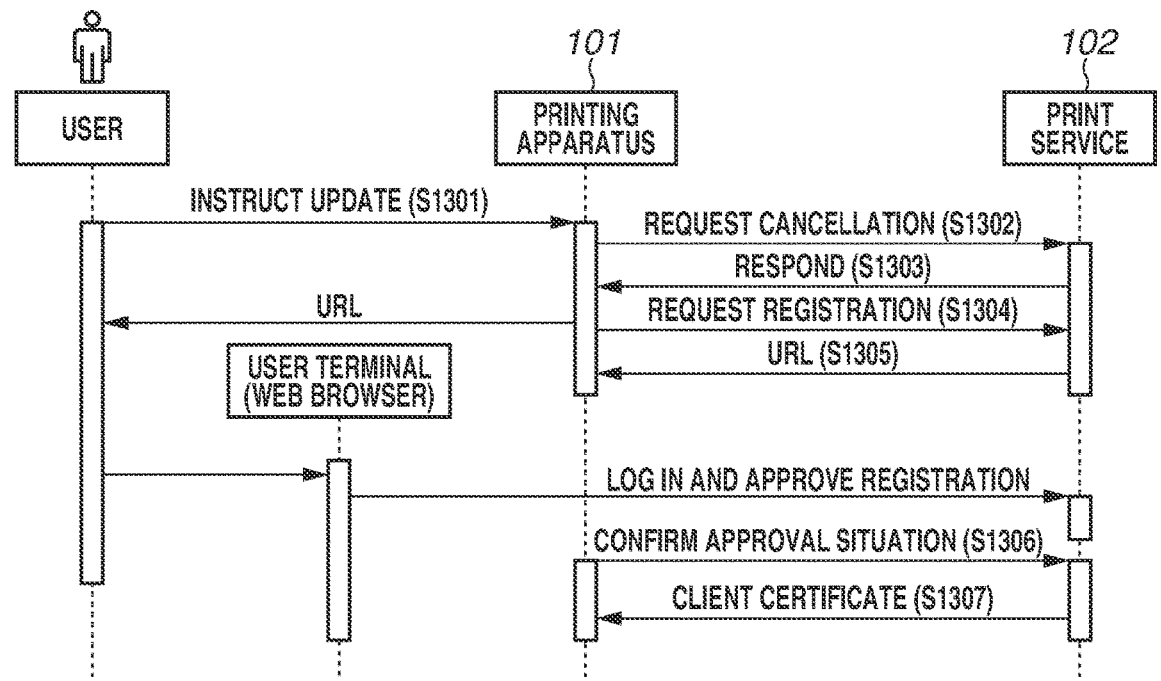
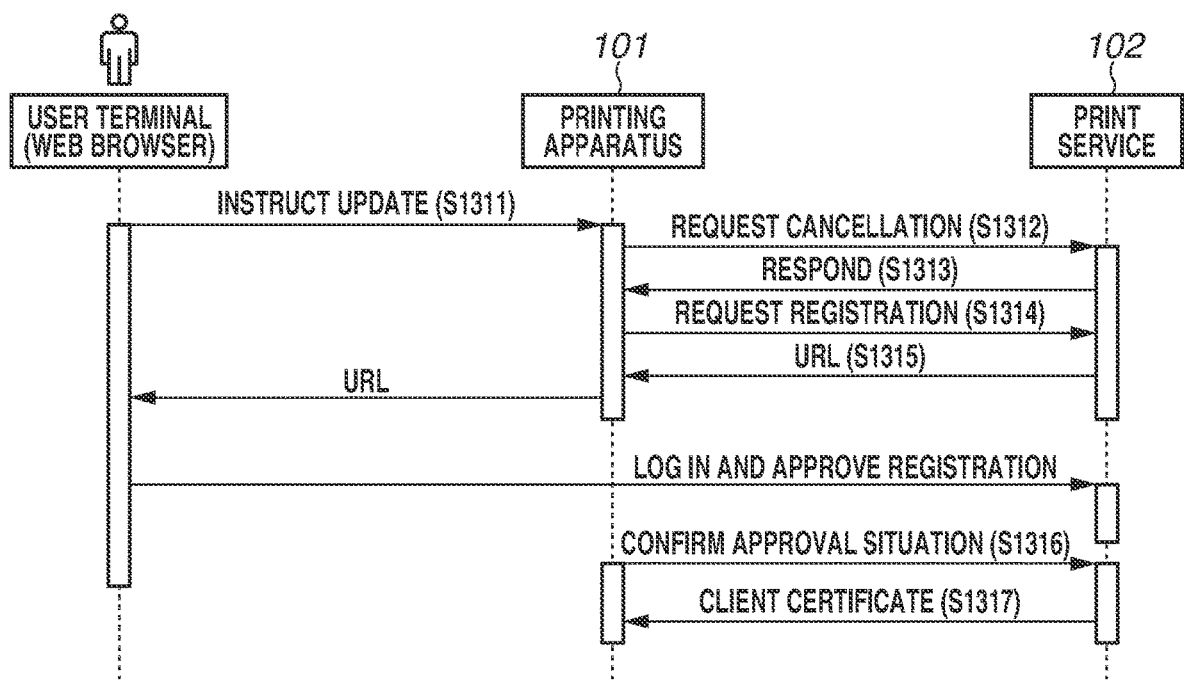

FIG.14

LIST OF PRINTERS FOR WHICH USER HAS ADMINISTRATIVE RIGHTS

| PRINTER NAME | EXPIRATION DATE | | |
|---|---|---|---|
| PRINTING APPARATUS 101 | JANUARY 20, 2020 | UPDATE | DELETE |
| PRINTING APPARATUS 104 | DECEMBER 20, 2025 | UPDATE | DELETE |

1401

PRINTING APPARATUS, METHOD, AND STORAGE MEDIUM

BACKGROUND

Field

The present disclosure relates to techniques and mechanisms for a printing apparatus to instruct update of information regarding the printing apparatus where the printing apparatus is registered with a cloud print service.

Description of the Related Art

Recently, a cloud print service has been developed in which a printing apparatus is registered with a print service provided by a server on the Internet. In some such systems, the printing apparatus receives print jobs output in response to instructions from clients via the cloud service, and executes printing. In order for the printing apparatus to work together effectively with the cloud print service, the printing apparatus needs to have mechanisms for interacting with the cloud print service.

Such interactions can be implemented by registering the printing apparatus with the cloud print service. In a case where the printing apparatus is to be registered with the cloud print service, in some systems, the following operations are needed: an administrator of the printing apparatus makes a registration request to the cloud print service via the printing apparatus, then logs into the cloud print service using a web browser of a client, and permits registration of the printing apparatus.

Further, in a case where the printing apparatus uses the cloud print service, a client certificate is used for certifying, to the cloud print service, that the client is a registered printing apparatus, and the client certificate is used by the cloud service to authenticate the printing apparatus that is in communication with the cloud print service, as discussed in Japanese Patent Application Laid-Open No. 2013-41552.

SUMMARY

According to various embodiments of the present disclosure, a printing apparatus configured to execute printing in response to receiving print data from a print service configured to provide a service via the Internet includes an obtainment unit configured to obtain a client certificate for the printing apparatus, the client certificate being issued by the print service when the printing apparatus is registered by the print service in response to a request to register the printing apparatus transmitted to the print service, a print unit configured to transmit the client certificate to the print service, receive the print data after the print service authenticates the printing apparatus based on the client certificate, and execute printing, a notification unit configured to issue a notification for updating the client certificate in a case where it is determined that the client certificate is to expire after an expiration date described in the client certificate, and an update unit configured to update the client certificate based on a user instruction.

Further features of the present disclosure will become apparent from the following description of exemplary embodiments with reference to the attached drawings.

BRIEF DESCRIPTION OF THE DRAWINGS

FIG. 5 illustrates a sequence in a case where the printing apparatus is registered with a print service according to one embodiment.

FIG. 10 illustrates an example of an e-mail in a case where a notification is made by e-mail according to one embodiment.

FIG. 11 illustrates a sequence of updating a client certificate according to one embodiment.

FIG. 13 illustrates a sequence of updating a client certificate according to one embodiment.

FIG. 14 illustrates a user interface of a print service which manages a printer according to one embodiment.

DESCRIPTION OF THE EMBODIMENTS

Use of a client certificate can facilitate communication between a cloud print service and a printing apparatus. However, in some circumstances, an issue can arise where the client certificate has an expiration date, and the printing apparatus cannot be authenticated—and thus cannot use the cloud print service, after the client certificate expires.

Where a cloud print service does not have a function for reissuing a client certificate, an administrator of the printing apparatus may need to cancel a registration of the printing apparatus with the cloud print service and then register the printing apparatus again, in order to continue using the cloud print service once a client certificate has expired. Performing such cancellation and reregistration can require a user to expend time and energy.

Various embodiments of the present disclosure are directed to notifying a user of a time to update the client certificate for a printing apparatus registered with a cloud print service, and providing a method for updating the client certificate to the user so that the work a user needs to perform to update registration of the printing apparatus with the cloud print service is reduced.

An exemplary embodiment of the present disclosure will be described in detail below with reference to the attached drawings.

Figure 1:
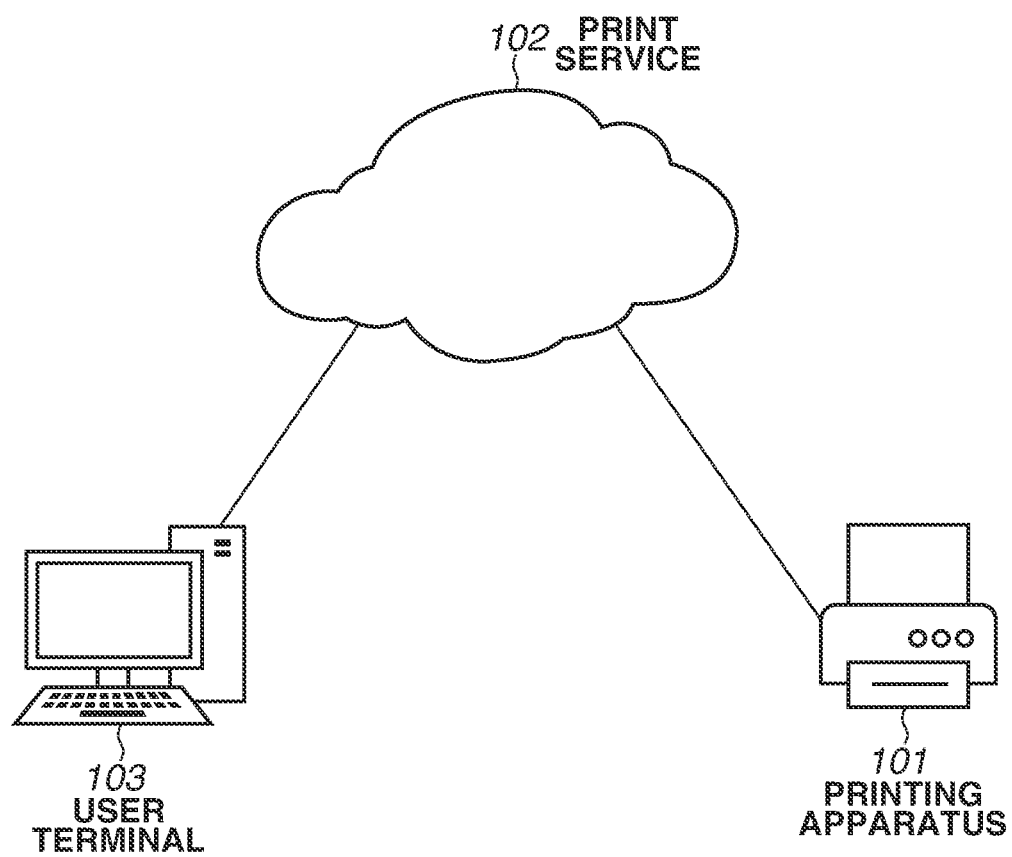
FIG. 1 illustrates a system configuration according to one embodiment.

FIG. 1 is a configuration diagram illustrating a print system including a printing apparatus to which embodiments of the present disclosure can be applied. In FIG. 1, one embodiment of the present disclosure is applied to a printing apparatus 101. A print service 102 is provided on the Internet. A user terminal 103 is included in the print system. The printing apparatus 101 is registered with the print service 102 in advance by an owner of the printing apparatus. A user selects the printing apparatus 101 registered with the print service 102 from the user terminal 103 and transmits print data to the print service 102. The printing apparatus 101 receives the print data transmitted by the user via the print service 102 and performs printing. It is not illustrated, but a user terminal is not limited to the user terminal 103, and the print service 102 can be used from a plurality of user terminals such as a general-purpose personal computer and a smartphone. The printing apparatus 101 and the user terminal 103 are connected with each other via the print service 102 and the Internet.

<Hardware Configuration of Printing Apparatus>

Figure 2:
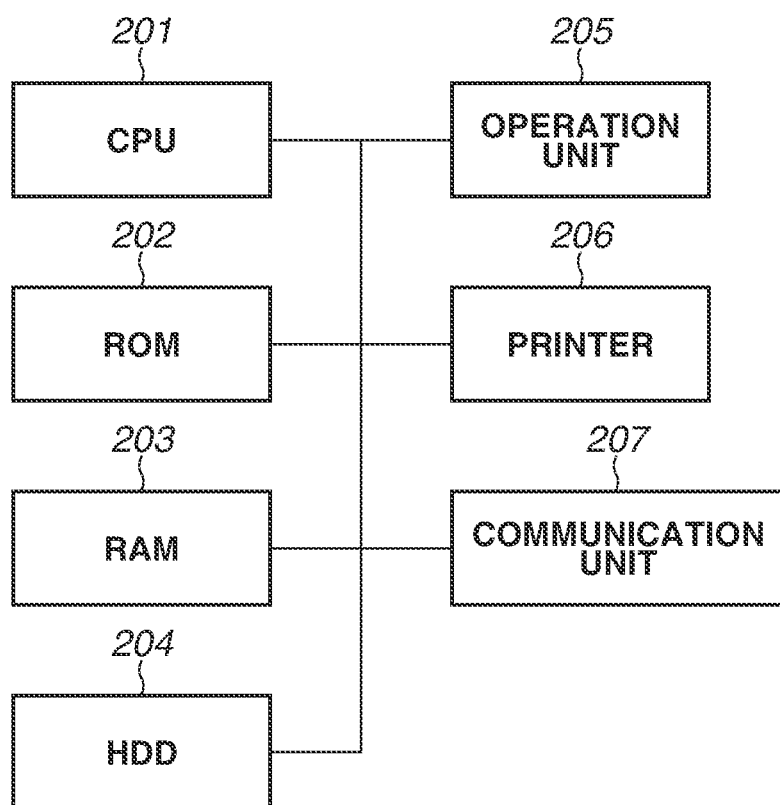
FIG. 2 illustrates a hardware configuration of a printing apparatus according to one embodiment.

FIG. 2 is a schematic diagram illustrating a hardware configuration of the printing apparatus 101. A central processing unit (CPU) 201 (processor) controls operations of an entire multifunction peripheral. A random access memory (RAM) 203 is a volatile memory and used as a work area and a temporary storage area for developing various control programs stored in a read-only memory (ROM) 202 and a hard disk drive (HDD) 204.

The ROM 202 is a nonvolatile memory which stores a boot program of the multifunction peripheral and the like. The HDD 204 is a nonvolatile hard disk which has a large capacity compared to the RAM 203. The HDD 204 stores a control program of the multifunction peripheral. The HDD 204 further stores an operating system (OS) and an application program.

When the multifunction peripheral is started up, the CPU 201 executes the boot program stored in the ROM 202. The boot program is used to read a program of the OS stored in the HDD 204 and to develop the program in the RAM 203. The CPU 201 executes the boot program and subsequently executes the program of the OS developed in the RAM 203 to control the multifunction peripheral. The CPU 201 further stores data used for an operation by a control program in the RAM 203 and performs reading and writing of the data.

In the multifunction peripheral, a single CPU 201 executes each processing illustrated in flowcharts described below. However, another configuration may be adopted. For example, a plurality of CPUs and micro processing units (MPUs) can execute each processing illustrated in the flowcharts described below in cooperation. Further, a part of the processing described below may be executed using a hardware circuit such as an application specific integrated circuit (ASIC) and a field-programmable gate array (FPGA).

An operation unit 205 is a display on which a touch operation can be performed. A printer 206 is a printer engine which prints print data received from an external device via a communication unit 207. The communication unit 207 is a network interface for connecting to the Internet and a local area network (LAN) in an office. The user terminal 103 and the print service 102 include hardware configurations similar to those of the CPU 201, the ROM 202, the RAM 203, and the HDD 204.

<Software Configuration>

Figure 3:
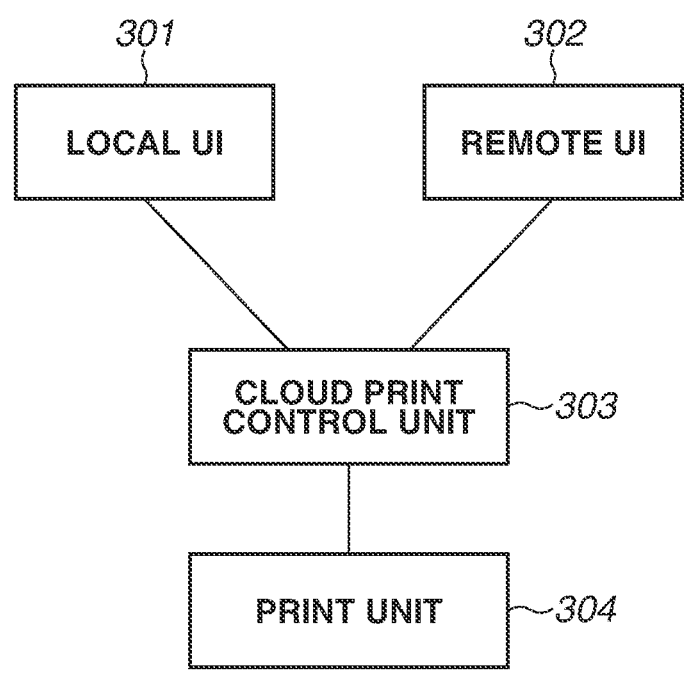
FIG. 3 illustrates a software configuration of the printing apparatus according to one embodiment.

FIG. 3 is a schematic diagram illustrating a software configuration of the printing apparatus 101. The CPU 201 develops and executes a program stored in the ROM 202 in the RAM 203, thereby realizing the software configuration. A local user interface (UI) 301 provides a user with a user interface for changing a setting of the printing apparatus and using a function of the printing apparatus on the display of the operation unit 205. A remote UI 302 provides a user with a user interface which has a HyperText Transfer Protocol (HTTP) server function and is formed of HyperText Markup Language (HTML). A user can access the remote UI 302 using a web browser of the user terminal 103, and change the setting or use the function of the printing apparatus 101.

A cloud print control unit 303 is a software module on which a communication protocol and a function to support the print service 102 are mounted. A print unit 304 receives print data which is received by the cloud print control unit 303 from the print service 102 and controls the printer 206 to execute print processing. A user authentication unit 305 (not illustrated) is a software module for authenticating a user who uses the local UI 301 and the remote UI 302. Accounts of an administrator and a general user can be stored in the HDD 204 via the user interfaces of the local UI 301 and the remote UI 302. A user name, a password, a role (an administrator/a general user), and an e-mail address can be stored in the HDD 204 as account information.

The user authentication unit 305 obtains a user name and a password from a login screen displayed on the local UI 301 and the remote UI 302 and performs user authentication by comparing the user name and the password with the account information stored in the HDD 204. In a case where the authentication is successful, the user authentication unit 305 allows the user who succeeds in the authentication to log in to the printing apparatus 101. More specifically, the user authentication unit 305 instructs the local UI 301 and the remote UI 302 to close the login screen and shift to a menu screen. Further, the user authentication unit 305 transmits information about the user (the user name, the role, and an e-mail address) who has logged in to the printing apparatus 101 to the software module such as the cloud print control unit 303.

The user terminal 103 includes a web browser (not illustrated) which transmits an HTML request and displays a screen based on HTML received as a response. The print service 102 has a function of registering the printing apparatus 101 and a function of converting print data designated to be printed from the user terminal 103 into a print job and providing the print job to the printing apparatus 101 which is selected from a plurality of registered printing apparatuses 101. These functions are also provided in the form of the software configuration, and the CPU 201 develops and executes a program stored in the ROM 202 in the RAM 203, thereby realizing the software configuration.

Figure 4:
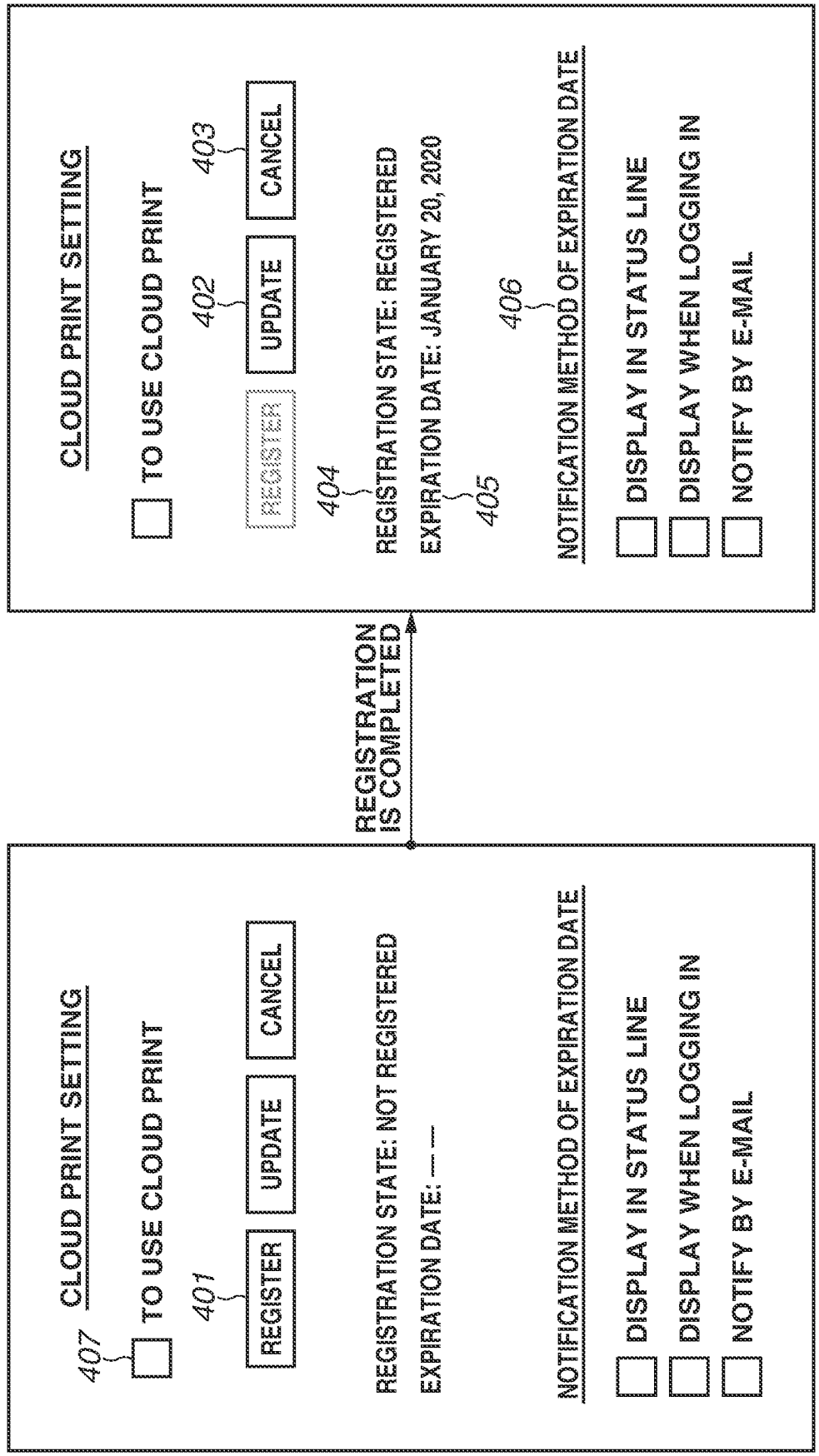
FIG. 4 illustrates a user interface set in the printing apparatus according to one embodiment.

The local UI 301 and the remote UI 302 provide a user with the user interface for registering the printing apparatus 101 with the print service 102, updating the registration, and cancelling the registration. The user interface is illustrated in FIG. 4. The user interface in FIG. 4 is provided by both of the local UI 301 and the remote UI 302, and an owner and an administrator of the printing apparatus 101 can perform operations from both of the user interfaces. A registration button 401 is used to perform processing for registering the printing apparatus 101 with the print service 102. The user interface in FIG. 4 is provided only in a case where the administrator logs in to the printing apparatus 101 from the login screen displayed on the local UI 301 and the remote UI 302. A check box 407 is used by a user to select either to use cloud print or not. A selected state of the check box is stored in the HDD 204 as a setting. A user who uses the cloud print checks the check box 407 and then performs an operation to register the printing apparatus 101 with the print service 102.

Regarding a flow of registration processing, a case in which the local UI 301 is used and a case in which the remote UI 302 is used are respectively described with reference to a sequence diagram in FIG. 5.

<Flow for Registering Printing Apparatus Using Local UI 301>

A user logs in to the printing apparatus 101 from the local UI 301, and a cloud print setting screen illustrated in FIG. 4 is displayed. In step S501, the user issues a registration instruction by pressing the registration button 401. The cloud print control unit 303 of the printing apparatus 101 detects the registration instruction, generates a pair of a public key and a private key, and generates a certificate signing request (CSR). The CSR is a message format of a certificate signing request transmitted from an applicant to a certificate authority to make an application for a public key certificate. The CSR includes information for identifying the applicant and the public key generated as described above. The information for identifying the applicant included in the CSR includes a common name, an organization name, a division name, an address, and a country code. The printing apparatus 101 uses a printer name "printing apparatus 101" as the common name. As the organization name, the division name, the address, and the country code, default values stored in the printing apparatus 101 at time of shipment from a factory are used.

In step S502, the printing apparatus 101 transmits a registration request to the print service 102 together with the CSR. The registration request includes configuration information about the printing apparatus 101, such as a printer name, a model name, a mounted unit, and a printing capability such as monochromatic/color printing. In step S503, the print service 102 generates a Uniform Resource Locator (URL) for registering the printing apparatus 101 in response to reception of the registration request and returns the URL to the printing apparatus 101. At this point, the printing apparatus 101 is not yet registered with the print service 102. When printer registration is received from the printing apparatus 101, the print service 102 issues a client certificate described below.

The information included in the client certificate issued by the print service 102 to the printing apparatus 101 is shown in the following Table 1.

TABLE 1

| Item | Value |
| --- | --- |
| Version | V3 |
| Serial Number | 123456789 |
| Issuer | CN = Print Service 102 |
| User Identifier | CN = printing apparatus 101 |
| Start Of A Valid Period | Jan. 20, 2018 |
| End Of The Valid Period | Jan. 20, 2020 |
| Public Key | 30 82 01 0a 02 . . . |
| Signature Algorithm | SHA256-RSA |
| Signature | 36 79 ca 35 66 87 72 . . . |

A version represents a version of X.509 which is a format of the certificate. A serial number is a serial number assigned to the certificate issued by the print service 102. An issuer is an identifier of the print service 102 which is an issuer of the certificate. A user identifier is an identifier of the printing apparatus 101 which is an issuance requester of the certificate. Start of a valid period represents a date on which use of the certificate is started. End of the valid period represents the expiration date on which a use period of the certificate expires. In the following description, the end of the valid period is simply referred to as the expiration date. A public key is the public key included in the CSR by the printing apparatus 101. A signature algorithm is an algorithm of a signature in the certificate. A signature is a digital signature assigned by the print service 102 as the issuer to the certificate. The signature is signed by a private key owned by the print service 102.

The certificate is an example in a case where the print service 102 has a certificate issuance function. However, the print service 102 may issue the certificate, using a certificate issuance service of a third party. In a case where the print service 102 uses the certificate issuance service of the third party, an identifier and a signature of an issuer are those of the certificate issuance service of the third party.

The printing apparatus 101 displays the received URL on the local UI 301 and prompts the user to access the URL for registering the printing apparatus. A quick response (QR) code (registered trademark) of the URL being encoded may be displayed so that a camera on a smartphone and the like can read the QR Code®. Alternatively, the printing apparatus 101 may instruct the print unit 304 to print the URL and the QR Code® on a sheet.

Figure 6:
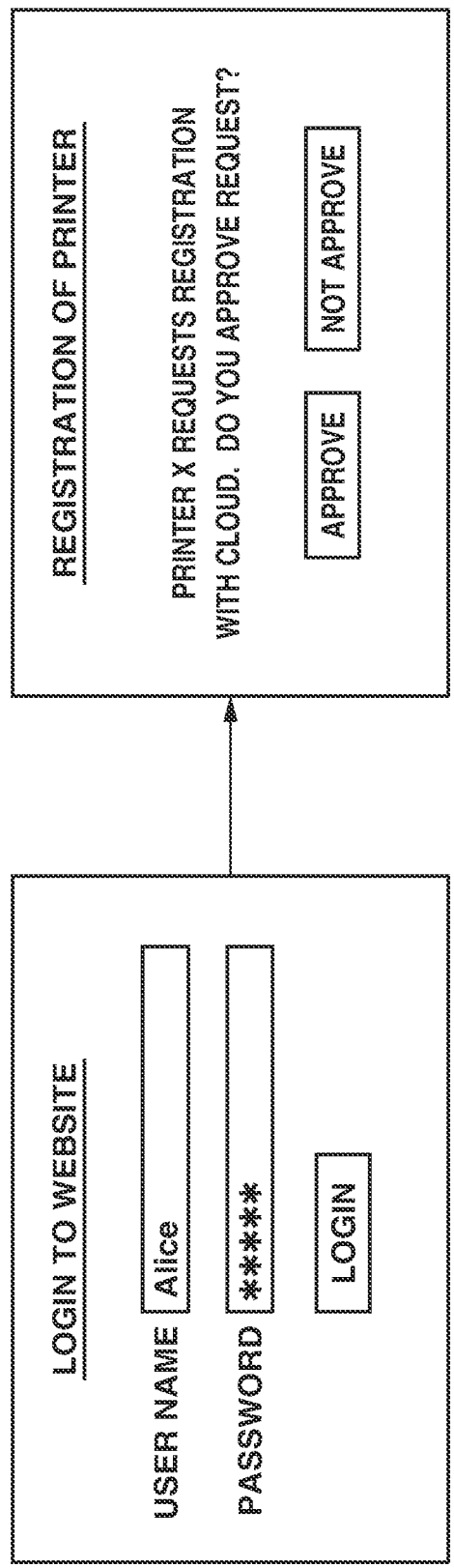
FIG. 6 illustrates a user interface of a print service which approves registration according to one embodiment.

The user accesses the URL, using the web browser of the user terminal 103. FIG. 6 illustrates an example of an interface of a website in a case where the user accesses the URL using the web browser of the user terminal. When the user accesses the URL, the user is requested to log in to the website. In a case where the user performs login by inputting a login account of the website, subsequently, a user interface requesting approval of registration of the printing apparatus 101 is displayed.

In step S504, the printing apparatus 101 regularly accesses the print service 102 and confirms a registration approval situation. In a case where the registration is approved on the user interface in FIG. 6, in step S505, the print service 102 returns the client certificate in the X.509 format issued for the printing apparatus 101 to the printing apparatus 101. The confirmation of the registration approval situation is started after the processing in step S503 and repeated until the client certificate is successfully obtained, a notification representing that approval is cancelled is received from the print service 102, or a certain period passes.

In a case where reception of the client certificate is successful, the cloud print control unit 303 of the printing apparatus 101 stores the client certificate in the HDD 204. In addition, the cloud print control unit 303 stores a registration state 404 of the printing apparatus as "registered" and completes registration processing. In a case where the user interface in FIG. 4 is displayed, the expiration date described in the client certificate is obtained and displayed as an expiration date 405 of cloud print. In a case where the registration instruction is received in step S501, the user name and the e-mail address of the logged-in user are obtained from the user authentication unit 305 and temporarily stored. After completion of the registration processing, the user name and the e-mail address are stored in the HDD 204 as information about a registrant.

<Flow for Registering Printing Apparatus Using Remote UI 302>

In a case where a user uses the remote UI 302, the user logs into the printing apparatus 101 from the remote UI 302 and displays the cloud print setting screen (FIG. 4) generated in the HTML. In step S511, the user issues a registration instruction by pressing the registration button 401. The cloud print control unit 303 of the printing apparatus 101 detects the registration instruction, generates a pair of a public key and a private key, and venerates a CSR.

In step S512, the printing apparatus 101 transmits a registration request to the print service 102 together with the CSR. In step S513, the print service 102 generates the URL for registering the printing apparatus 101 in response to reception of the registration request and returns the URL to the printing apparatus 101.

The printing apparatus 101 provides the web browser of the user terminal 103 with a link of the URL obtained from the print service 102 in the HTML. Alternatively, the printing apparatus 101 may display a user link button on a screen displayed on the web browser and transmit a redirect request so that the web browser of the user terminal is redirected to the URL obtained from the remote UI without causing the user to press the user link button. Subsequent operations of the printing apparatus 101 in steps S514 and S515 are similar to those in steps S504 and S505.

<Print Flow>

Figure 7:
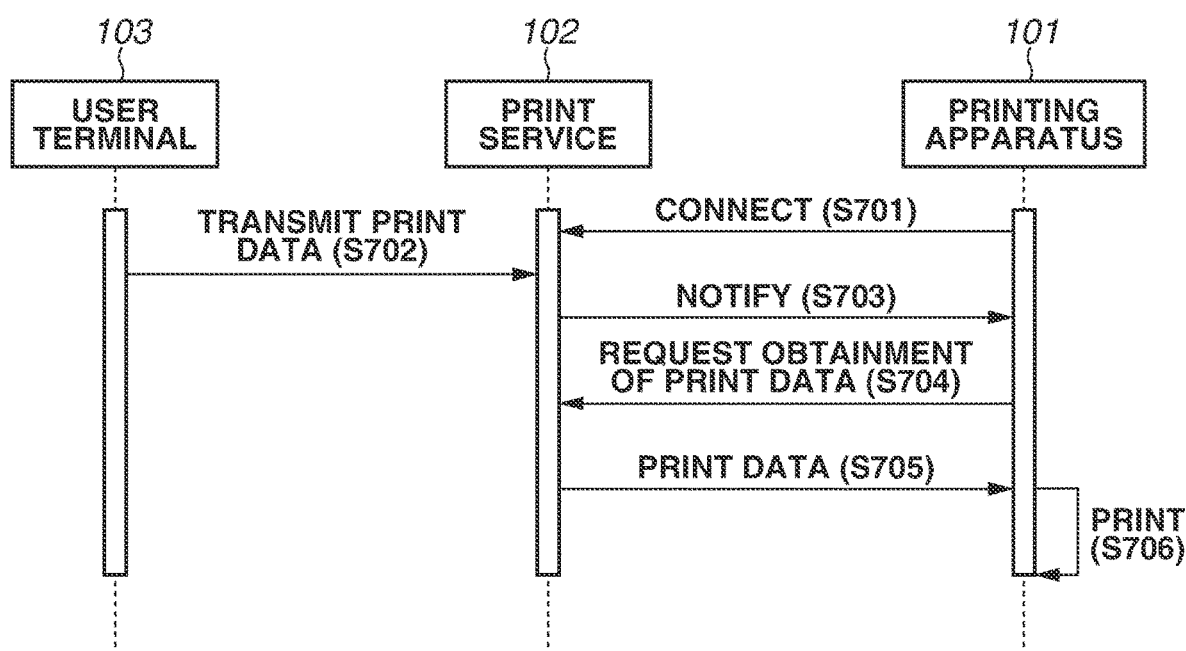
FIG. 7 illustrates a sequence of printing according to one embodiment.

A flow in a case where a user causes the printing apparatus 101 to perform printing from the user terminal 103 via the print service 102 is described with reference to a sequence diagram in FIG. 7.

In step S701, the cloud print control unit 303 of the printing apparatus 101 detects that a cloud print function is enabled and connects to the print service 102. Regarding determination of whether the cloud print function is enabled or disabled, it is determined as enabled in a case where the check box 407 is in the selected state, and the registration state 404 is "registered" in FIG. 4, and a case other than that is determined as disabled. In a case where the printing apparatus 101 connects to the print service 102, the printing apparatus 101 presents the client certificate to the print service 102 and is authenticated by the print service 102. More specifically, the print service 102 verifies the digital signature assigned to the client certificate to confirm that the client certificate is an authorized certificate. Further, the print service 102 tries to decode an encrypted message included in the processing in step S701, using the public key of the printing apparatus 101 included in the certificate. In a case where the message can be correctly decoded, the print service 102 confirms that the printing apparatus 101 is an authorized client who owns the private key of the printing apparatus 101 and authenticates the printing apparatus 101.

In step S702, a user designates the printing apparatus 101 registered with the print service 102 from the user terminal 103 and transmits print data to the print service 102. For example, the web browser corresponding to the print service 102 is installed in the user terminal 103, and the printing apparatus registered with the print service 102 can be selected from a print menu of the web browser.

In step S703, the print service 102 generates a print job for receiving print data from the user terminal 103 and notifies the printing apparatus 101 of existence of the print job using the connection established in step S701. In step S704, the printing apparatus 101 having received the notification requests obtaining the print data included in the print job from the print service 102. In step S705, the print service 102 returns the print data to the printing apparatus 101 in response to the request. In step S706, the cloud print control unit 303 of the printing apparatus 101 transmits the received print data to the print unit 304 so that the print unit performs print processing. The print data obtained in step S705 may be the print data transmitted from the user terminal 103 in step S702 or may be, for example, print data in a different format converted by the print service 102.

<Notification Processing of Expiration Date of Client Certificate>

A notification unit configured to issue a notification about the expiration date of the client certificate according to an embodiment of the present disclosure is described. The cloud print control unit 303 regularly compares a current time set in the printing apparatus 101 with the expiration date of the client certificate stored in the HDD 204 and determines whether the expiration date of the client certificate is close. A frequency of confirming the expiration date and a period for determining that the expiration date is close may be defined in the printing apparatus in advance or may be set by a user of the printing apparatus. For example, the expiration date is confirmed at the timing when a power source of the printing apparatus is turned on and in a 24-hour period, and the period for determining that the expiration date is close may be a month before the expiration date. In a case where the expiration date of the client certificate is close, a notification is issued to a user by the following three methods. For example, one of the notification methods may be selected and used, or two or more notification methods may be selected and used in combination as a setting of an "expiration date notification method 406" illustrated in FIG. 4.

A user selects the expiration date notification method 406 after the registration state 404 is shifted to "registered". The cloud print control unit 303 may control the setting so that "display in status line" and "display when logging in" are to be in a selected state when the registration state 404 is shifted to "registered". In addition, "notify by e-mail" can be selected in a case where an e-mail notification can be used. More specifically, the e-mail notification can be used on condition that a mail server is set in advance in the printing apparatus 101 and that an e-mail address of a notification destination is already obtained. For example, an e-mail address of a user who logs in to the printing apparatus 101 and registers the printer in FIG. 5 is stored in the HDD 204 as the e-mail address of the registrant and can be used as the e-mail address of the notification destination. In addition, an e-mail address of the owner of the printing apparatus 101 can be stored in the HDD 204 as a setting of the printing apparatus 101 and used. Further, an e-mail address can be stored in the user identifier of the client certificate and used as the e-mail notification destination.

<Notification Method: Display in Status Line>

Figure 8:
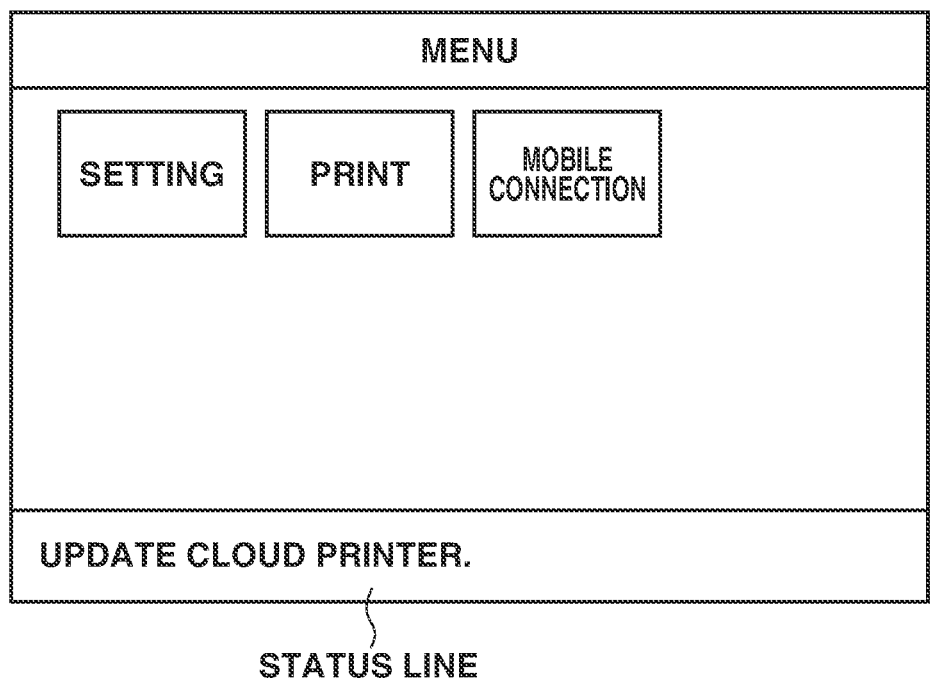
FIG. 8 illustrates a notification in a status line of the printing apparatus according to one embodiment.

A portion in which a message is displayed in a lower part of the local UI 301 is referred to as a status line. The status line is an area displayed adjacent to a function selection area of the printing apparatus 101 which is a top screen of the local UI. The printing apparatus 101 has a function of notifying a user of "running-out of print sheets", "running-out of ink and toner", "paper jam" and the like, using the status line. After detecting that the expiration date is close, the cloud print control unit 303 instructs the local UI 301 to display, in the status line, a message for prompting a user to execute update processing for updating the client certificate. The local UI 301 includes a configuration to display a message in the status line as illustrated in FIG. 8 in response to the instruction.

<Notification Method: Display when User Logs In>

Figure 9:
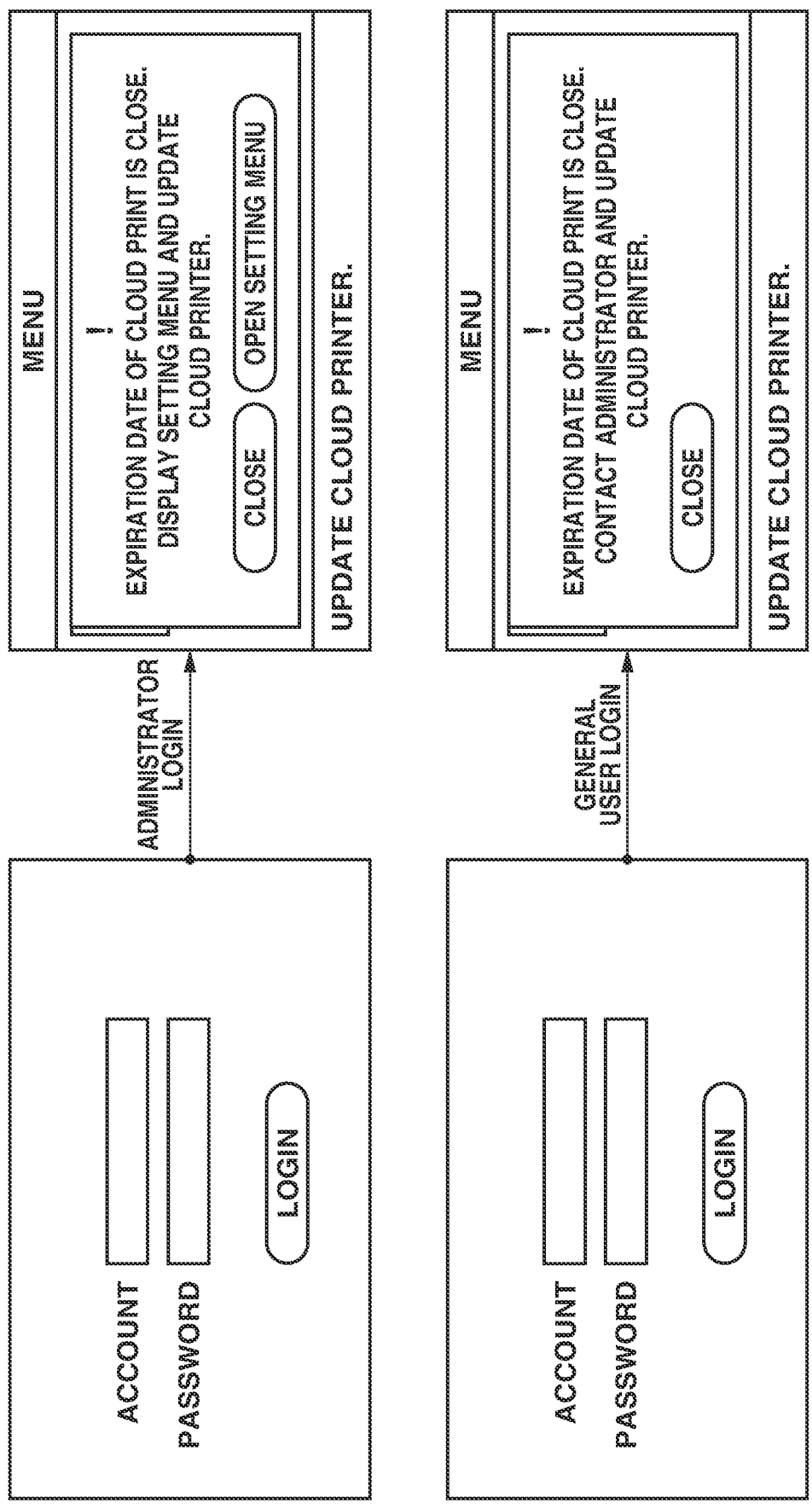
FIG. 9 illustrates a notification in a case where login to the printing apparatus is performed according to one embodiment.

In a case where a user has logged in to the printing apparatus 101 from the login screen of the local UI 301, the user authentication unit 305 notifies the cloud print control unit 303 that the user has logged in to the local UI 301. The cloud print control unit 303 determines the role (the administrator or the general user) of the user having logged in and instructs the local UI 301 to display a dialogue corresponding to the role of the user. FIG. 9 illustrates dialogue display. In a case where the administrator has logged in, the dialogue is popped up, and a message requesting update of the cloud printer is displayed. A button for displaying the cloud print setting screen (FIG. 4) may be displayed in the dialogue. When the button is pressed, the screen is shifted to the screen illustrated in FIG. 4. In a case where the general user has logged in, a message for prompting the user to contact the administrator to update the cloud printer is displayed.

In a case where the user has logged in to the printing apparatus 101 from the login screen of the remote UI 302, the user authentication unit 305 notifies the cloud print control unit 303 that the user has logged in to the remote UI 302. The cloud print control unit 303 determines the role (the administrator or the general user) of the user having logged in, generates a web page in the HTML corresponding to the role of the user, and causes the web browser to display the web page. In a case where the administrator has logged in, a web page including a message requesting update of the cloud printer is displayed. A link button for displaying the cloud print setting screen (FIG. 4) in the HTML may be displayed on the web page. When the link button is pressed, the screen is shifted to the screen illustrated in FIG. 4. In a case where the general user has logged in, a message for prompting the user to contact the administrator to update the cloud printer is displayed.

<Notification Method: Notify by E-Mail>

The printing apparatus 101 transmits a notification by an e-mail describing that the expiration date is close to the e-mail addresses of the owner or the administrator of the printing apparatus 101 registered with the print service in advance. FIG. 10 illustrates an e-mail notification. Identification information 1001 about the printing apparatus 101 includes a printer name and a serial number. The e-mail notification further includes an expiration date 1002, a registration update procedure 1003 of the printing apparatus, a URL 1004 of the website of the printing apparatus having an update function, and a URL 1005 of the print service having the update function.

In a case where the URL 1004 is clicked, the web browser is started on the user terminal which has opened the e-mail, and the remote UI 302 which accesses the printing apparatus displays the login screen on the web browser. When the user logs in, the remote UI 302 displays the cloud print setting screen (FIG. 4) in the HTML. The user can issue an instruction to perform the update processing by pressing an update button 402 on the cloud print setting screen.

In a case where the URL 1005 is clicked, the web browser is started on the user terminal which has opened the e-mail, and an access is performed to the website included in the print service 102. The user can display a screen of a list of printers managed by himself/herself (FIG. 14) after performing a login operation on the login screen of the website and issue an instruction to perform the update processing by pressing an update button 1401. The e-mail notification may be similarly performed from the print service 102 to the e-mail addresses of the owner or the administrator of the printing apparatus 101. In this case, a part of or entire notification information (the identification information about the printing apparatus, the update procedure of the printing apparatus, and the URL of the remote UI of the printing apparatus including an update unit) is registered with a cloud service when the printing apparatus 101 is registered with the cloud service.

<Processing of Updating Client Certificate>

Next, the update unit of the client certificate according to an embodiment of the present disclosure is described. A user who has performed the registration processing in FIG. 5 performs login on the login screen displayed on the local UI 301 or the remote UI 302, and then the cloud print setting screen illustrated in FIG. 4 is displayed. The cloud print control unit 303 stores a user name included in login account information about the user who has performed the registration processing in FIG. 5 in the HDD 204 as the user name of the registrant. Control may be performed in such a way that the update button 402 can be pressed only in a case where the user name of the login user coincides with the user name of the registrant and that the update button 402 may be grayed out so that the update button 402 cannot be pressed in a case where another user has logged in.

Regarding processing of updating the client certificate of the printing apparatus 101 in a case where a user presses the update button 402 illustrated in FIG. 4, operations are described respectively in a case where the local UI 301 is used and in a case where the remote UI 302 is used with reference to a sequence diagram in FIG. 11. In the sequence in FIG. 11, the print service 102 has a function of updating the client certificate.

<Flow for Updating Client Certificate Using Local UI 301 in FIG. 11>

In step S1101, a user issues an update instruction by pressing the update button 402 on the cloud print setting screen (FIG. 4) displayed on the local UI 301. In step S1102, the cloud print control unit 303 of the printing apparatus 101 detects the update instruction, generates a CSR, and transmits an update request to the print service 102 together with the CSR. In step S1103, the print service 102 generates a URL for updating the client certificate and returns the URL to the printing apparatus 101.

Figure 12:
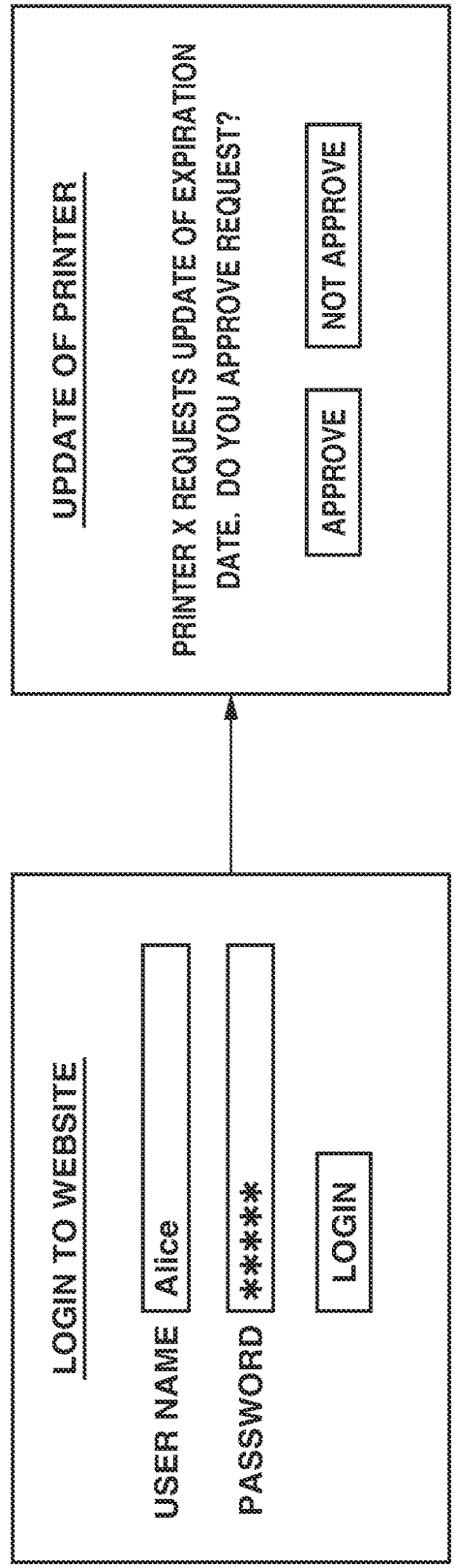
FIG. 12 illustrates a user interface of a print service which approves update according to one embodiment.

The printing apparatus 101 displays the received URL on the local UI 301 and prompts the user to access the URL for updating registration of the printing apparatus 101. A QR Code® of the URL being encoded may be displayed so that a camera on a smartphone and the like can read the QR Code®. Alternatively, the printing apparatus 101 may instruct the print unit 304 to print the URL and the QR Code® on a sheet. The user accesses the URL, using the web browser of the user terminal. FIG. 12 illustrates an interface of a website in a case where the user accesses the URL, using the web browser of the user terminal. When the user accesses the URL, the user is requested to log in to the website. In a case where the user performs login by inputting a login account of the website, a user interface requesting approval of update of the expiration date of the printing apparatus 101 is displayed.

In step S1104, the printing apparatus 101 regularly accesses the print service 102 and confirms an update approval situation. In a case where the update is approved on the user interface in FIG. 12, in step S1105, the print service 102 returns a client certificate in the X.509 format newly issued for the printing apparatus 101 to the printing apparatus 101. The confirmation of the update approval situation is started after the processing in step S1103 and repeated until the client certificate is successfully obtained, a notification representing that approval is cancelled is received from the print service 102, or a certain period passes.

In a case where reception of the client certificate is successful, the cloud print control unit 303 of the printing apparatus 101 updates the old client certificate to the new client certificate and stores the updated client certificate in the HDD 204. In a case where the user interface in FIG. 5 is displayed, the local UI 301 obtains the expiration date described in the new client certificate and displays the obtained expiration date as the expiration date 405 of the cloud print. Further, the cloud print control unit 303 instructs the local UI 301 to stop display of a message prompting update processing displayed in the status line.

<Flow for Updating Client Certificate Using Remote UI 302 in FIG. 11>

In a case where a user uses the remote UI 302, the user logs in to the printing apparatus 101 from the remote UI 302 and displays the cloud print setting screen (FIG. 4) generated in the HTML. In step S1111, the user can issue an update instruction by displaying the cloud print setting screen (FIG. 4) and pressing the update button 402.

In step S1112, the cloud print control unit 303 of the printing apparatus 101 detects the update instruction, generates a CSR, and transmits an update request to the print service 102 together with the CSR. In step S1113, the print service 102 generates a URL for updating the client certificate and returns the URL to the printing apparatus 101.

The printing apparatus 101 displays a link button of the received URL on the remote UI 302 and prompts the user to access the URL for updating registration of the printing apparatus. The printing apparatus 101 may transmit a redirect request so that the web browser of the user terminal is redirected to the obtained URL without causing the user to press the user link button.

When the web browser of the user terminal accesses the URL, the user is requested to log in to the website. In a case where the user performs login by inputting the login account of the website, the user interface requesting approval of update of the expiration date of the printing apparatus 101 is displayed.

In step S1114, the printing apparatus 101 regularly accesses the print service 102 and confirms the update approval situation. In a case where the update is approved on the user interface in FIG. 12, in step S1115, the print service 102 returns a client certificate in the X.509 format newly issued for the printing apparatus 101 to the printing apparatus 101. The confirmation of the update approval situation is started after the processing in step S1113 and repeated until the client certificate is successfully obtained, a notification representing that approval is cancelled is received from the print service 102, or a certain period passes.

In a case where reception of the client certificate is successful, the cloud print control unit 303 of the printing apparatus 101 updates the old client certificate to the new client certificate and stores the updated client certificate in the HDD 204. In a case where the user interface in FIG. 5 is displayed, the remote UI 302 obtains the expiration date described in the new client certificate and displays the obtained expiration date as the expiration date 405 of the cloud print.

The printing apparatus 101 according to the present exemplary embodiment is configured to receive the URL in steps S1103 and S1113 as a response to the update request and then to confirm the approval situation. However, the client certificate may be automatically issued without receipt of an approval request from a user. In this case, the print service 102 newly issues the client certificate in response to reception of the update request in steps S1102 and S1112 and transmits the client certificate as a response to the update request.

The processing of updating the client certificate of the printing apparatus 101 in a case where a user presses the update button 402 illustrated in FIG. 4 is described with reference to a sequence diagram in FIG. 13. The sequence in FIG. 13 illustrates a case in which the print service 102 does not have a function of updating the client certificate. In this case, the print service 102 has a function of issuing the client certificate only when a printer is to be registered, and update of the client certificate while maintaining registration of the printing apparatus 101 is not assumed.

The print service 102 is described as a single service. However, the system illustrated in FIG. 1 may include a plurality of print services 102. Further, in a case where the printing apparatus 101 can cooperate with the plurality of the print services 102 and determines that cooperation is established with the print service 102 which does not have the function of updating the client certificate among the plurality of the print services 102, the client certificate is updated by a method for reregistering the printing apparatus 101 which is described below.

<Flow for Updating Client Certificate Using Local UI 301 in FIG. 13>

In step S1301, a user issues an update instruction by pressing the update button 402 on the cloud print setting screen (FIG. 4) displayed on the local UI 301.

In step S1302, the cloud print control unit 303 of the printing apparatus 101 transmits a request to cancel the printer registration to the print service 102 in response to detection of the update instruction. In step S1303, in a case where the printing apparatus 101 receives a response from the print service 102, the printing apparatus 101 generates a CSR and, in step S1304, transmits a registration request to the print service 102 together with the CSR. The sequence in steps S1304 to S1307 is similar to that in steps from S502 to S505 in FIG. 5.

The cloud print control unit 303 of the printing apparatus 101 which has received the new client certificate in step S1307 updates the old client certificate to the new client certificate and stores the updated client certificate in the HDD 204. In a case where the user interface in FIG. 5 is displayed, the local UI 301 obtains the expiration date described in the new client certificate and displays the obtained expiration date as the expiration date 405 of the cloud print. Further, the cloud print control unit 303 instructs the local UI 301 to stop display of the message prompting the update processing displayed in the status line.

<Flow for Updating Client Certificate Using Remote UI 302 in FIG. 13>

In a case where a user uses the remote UI 302, the user logs in to the printing apparatus 101 from the remote UI 302 and displays the cloud print setting screen (FIG. 4) generated in the HTML.

In step S1311 the user can issue an update instruction by displaying the cloud print setting screen (FIG. 4) and pressing the update button 402. In step S1312, the cloud print control unit 303 of the printing apparatus 101 transmits a request to cancel the printer registration to the print service 102 in response to detection of the update instruction. In step S1313, in a case where the printing apparatus 101 receives a response from the print service 102, the printing apparatus 101 generates a CSR and, in step S1314, transmits a registration request to the print service 102 together with the CSR. The sequence in steps from S1314 to S1317 is similar to that in steps from S502 to S505 in FIG. 5.

The cloud print control unit 303 of the printing apparatus 101 which has received the new client certificate in step S1317 updates the old client certificate to the new client certificate and stores the updated client certificate in the HDD 204. In a case where the user interface in FIG. 5 is displayed, the remote UI 302 obtains the expiration date described in the new client certificate and displays the obtained expiration date as the expiration date 405 of the cloud print.

<Flow for Updating Client Certificate Using Print Service 102>

Figure 15:
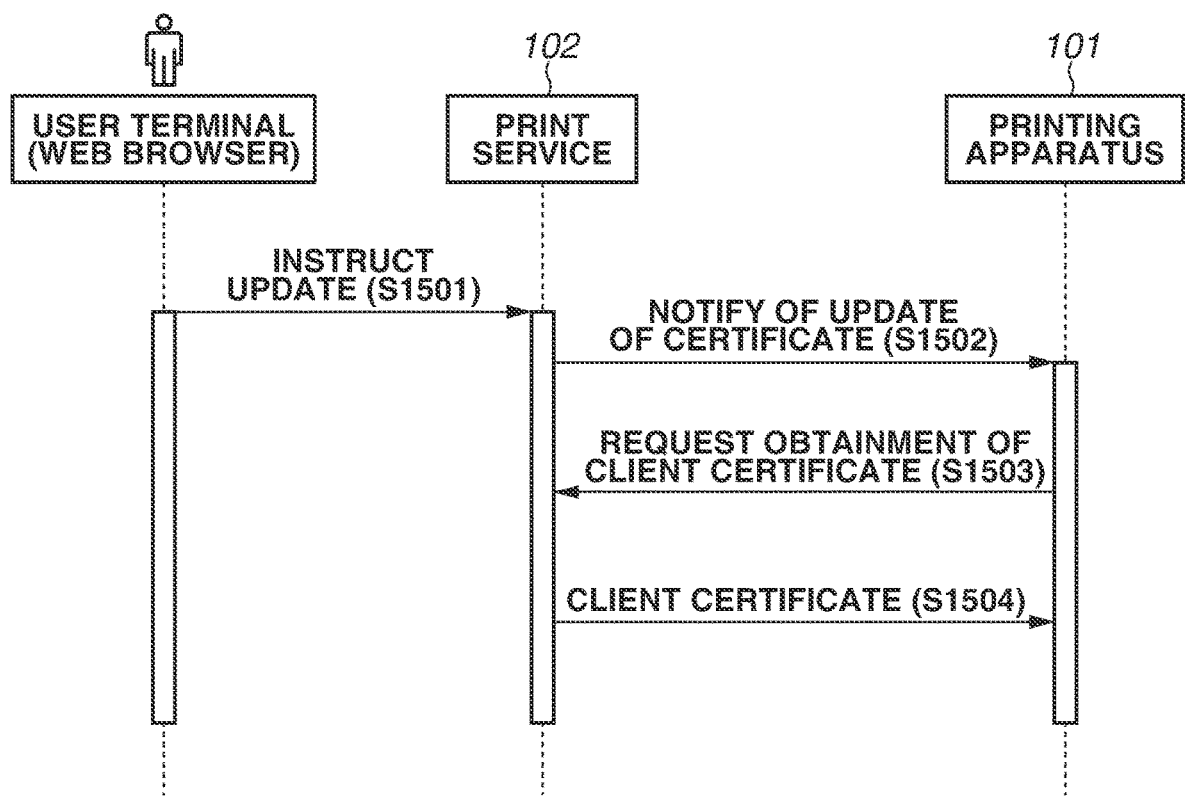
FIG. 15 illustrates a sequence of updating a client certificate according to one embodiment.

Next, certificate update processing in a case where the print service 102 provides a user with the function of updating the client certificate is described with reference to a sequence diagram in FIG. 15.

The print service 102 includes a website which the owner or the administrator of the printing apparatus 101 can access, and provides a function of updating the expiration date of the printing apparatus 101. For example, the print service 102 provides the web browser of the user terminal 103 with the user interface as illustrated in FIG. 14. In step S1501, the owner or the administrator of the printing apparatus 101 instructs the print service 102 to update the client certificate by pressing the update button 1401. In step S1502, the print service 102 notifies the printing apparatus 101 that the client certificate is updated, using connection from the printing apparatus 101 to the print service 102. In step S1503, the printing apparatus 101 having been notified requests the new client certificate from the print service 102.

In step S1504, the print service 102 generates a new client certificate based on information about the current client certificate for the printing apparatus 101 and transmits the new client certificate to the printing apparatus 101. The cloud print control unit 303 of the printing apparatus 101 which has received the new client certificate in step S1504 updates the old client certificate to the new client certificate and stores the updated client certificate in the HDD 204. In a case where the user interface in FIG. 5 is displayed, the local UI 301 obtains the expiration date described in the new client certificate and displays the obtained expiration date as the expiration date 405 of the cloud print. Further, the cloud print control unit 303 instructs the local UI 301 to stop display of the message prompting the update processing displayed in the status line.

As described above, according to an embodiment of the present disclosure, since the printing apparatus is provided with the function of issuing a notification in a case where the expiration date of the client certificate is close, the printing apparatus notifies the owner or the administrator of the printing apparatus that the expiration date is close so that the print service does not become unavailable due to expiration of the client certificate. Further, since the printing apparatus is provided with the function of updating the client certificate, the owner or the administrator of the printing apparatus can update the client certificate with small man-hours and reduce updating work.

Other Embodiments

The configuration of issuing a notification before the expiration date is described as the notification method. Alternatively, a notification may be issued after the expiration date. In addition, a notification content may be changed before and after the expiration date. For example, display contents in FIG. 9 are displayed to indicate that the cloud print has reached the expiration date.

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-100073, filed May 24, 2018, which is hereby incorporated by reference herein in its entirety.

What is claimed is:

1. A printing apparatus configured to execute printing in response to receiving print data from a print service configured to provide a service via the Internet, the printing apparatus comprising:
   one or more processors; and
   at least one memory coupled to the one or more processors and having stored therein instructions, which, when executed by the one or more processors, cause the printing apparatus to:
   obtain a client certificate for the printing apparatus, the client certificate being issued by the print service when the printing apparatus is registered by the print service in response to a request to register the printing apparatus transmitted to the print service;
   transmit the client certificate to the print service, receive the print data and execute printing;
   issue a notification for updating the client certificate in a case where it is determined that the client certificate is to expire after based on an expiration date described in the client certificate; and
   update the client certificate based on a user instruction.

2. The printing apparatus according to claim 1, further comprising a providing unit configured to provide an item for setting a notification method to be used by the notification unit, wherein the notification unit is configured to issue a notification for updating the client certificate by at least one or more notification methods based on a setting of the item provided by the providing unit.

3. The printing apparatus according to claim 1, wherein the update unit is configured to update the client certificate by replacing the client certificate obtained by the obtainment unit when the printing apparatus is registered, with a new client certificate issued by the print service in response to an update request transmitted to the print service.

4. The printing apparatus according to claim 1, wherein, in a case where the update unit determines that the print service issues a client certificate in response to a request to register a printing apparatus and that the client certificate is unable to be updated while a printing apparatus remains registered, the update unit is configured to request the print service to cancel registration of the printing apparatus, and replace the client certificate obtained by the obtainment unit when the printing apparatus was registered with a client certificate issued when the printing apparatus is reregistered.

5. The printing apparatus according to claim 2, wherein the notification unit is configured to issue a notification for updating the client certificate on a first screen to be displayed when a user logs into the printing apparatus, and wherein the providing unit is configured to provide a screen for receiving an instruction to update the client certificate in response to a user instruction received via the first screen.

6. The printing apparatus according to claim 1, wherein the notification unit is configured to issue a notification for updating the client certificate in a second area on a second screen which includes a first area for selecting a function of the printing apparatus and the second area for notifying a user of a state of the printing apparatus.

7. The printing apparatus according to claim 1, wherein the notification unit is configured to transmit an e-mail for a notification for updating the client certificate to an e-mail address of a user who has registered the printing apparatus.

8. The printing apparatus according to claim 7, wherein the e-mail includes information regarding the expiration date of the client certificate and a Uniform Resource Locator (URL) for displaying a screen for receiving an instruction to update the client certificate on a remote user interface (UI).

9. A method for a printing apparatus configured to execute printing in response to receiving print data from a print service configured to provide a service via the Internet, the method comprising:
- obtaining a client certificate for the printing apparatus, the client certificate being issued by the print service when the printing apparatus is registered by the print service in response to a request to register the printing apparatus transmitted to the print service;
- transmitting the client certificate to the print service, receiving the print data, and executing printing;
- issuing a notification for updating the client certificate in a case where it is determined that the client certificate is to expire based on an expiration date described in the client certificate; and
- updating the client certificate based on a user instruction.

10. A non-transitory computer-readable storage medium storing a program for causing a printing apparatus to perform a process, the printing apparatus configured to execute printing in response to receiving print data from a print service configured to provide a service via the Internet to execute, the process comprising:
- obtaining a client certificate for the printing apparatus, the client certificate being issued by the print service when the printing apparatus is registered by the print service in response to a request to register the printing apparatus transmitted to the print service;
- transmitting the client certificate to the print service, receiving the print data, and executing printing;
- issuing a notification for updating the client certificate in a case where it is determined that the client certificate is to expire based on an expiration date described in the client certificate; and
- updating the client certificate based on a user instruction.

11. A printing apparatus configured to print print data received from a print service configured to provide a service via the Internet, the printing apparatus comprising:
- one or more processors; and
- at least one memory coupled to the one or more processors and having stored thereon instructions, which when executed by the one or more processors, cause the printing apparatus to:
  - obtain a client certificate for utilizing the service, the client certificate being issued by a certificate function when the printing apparatus is registered by the print service in response to a request to register the printing apparatus transmitted to the print service;
  - transmit the client certificate for utilizing the service to the certificate function;
  - receive the print data, and execute a process for printing;
  - transmit a request for newly issuing the client certificate to the certificate function; and
  - receive a client certificate newly issued, and utilize the newly issued client certificate.

12. A method for a printing apparatus configured to print print data received from a print service configured to provide a service via the Internet, the method comprising:
- obtaining a client certificate for utilizing the service, the client certificate being issued by a certificate function when the printing apparatus is registered by the print service in response to a request to register the printing apparatus transmitted to the print service;
- transmitting the client certificate for utilizing the service to the certificate function;
- receiving the print data, and executing a process for printing;
- transmitting a request for newly issuing the client certificate to the certificate function; and
- receiving a client certificate newly issued, and utilizing the newly issued client certificate.

13. A non-transitory computer-readable storage medium storing a program for causing a printing apparatus to perform a process, the printing apparatus configured to print print data received from a print service configured to provide a service via the Internet, the process comprising:
- obtaining a client certificate for utilizing the service, the client certificate being issued by a certificate function when the printing apparatus is registered by the print service in response to a request to register the printing apparatus transmitted to the print service;
- transmitting the client certificate for utilizing the service to the certificate function;
- receiving the print data, and executing a process for printing;
- transmitting a request for newly issuing the client certificate to the certificate function; and
- receiving a client certificate newly issued, and utilizing the newly issued client certificate.

* * * * *